(12) United States Patent
Gruber et al.

(10) Patent No.: US 8,381,962 B2
(45) Date of Patent: Feb. 26, 2013

(54) INJECTION MOLDED SOLDER METHOD FOR FORMING SOLDER BUMPS ON SUBSTRATES

(75) Inventors: Peter A. Gruber, Mohegan Lake, NY (US); Paul A. Lauro, Brewster, NY (US); Jae-Woong Nah, Closter, NY (US); Kazushige Toriyama, Kyoto-fu (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/025,419

(22) Filed: Feb. 11, 2011

(65) Prior Publication Data
US 2011/0127312 A1 Jun. 2, 2011

Related U.S. Application Data

(62) Division of application No. 12/269,240, filed on Nov. 12, 2008, now Pat. No. 7,931,187.

(51) Int. Cl.
*B23K 1/00* (2006.01)
*B23K 37/00* (2006.01)
(52) U.S. Cl. ............................ 228/33; 228/39; 228/46
(58) Field of Classification Search ............... None
See application file for complete search history.

(56) References Cited

U.S. PATENT DOCUMENTS

| | | | |
|---|---|---|---|
| 5,244,143 A | 9/1993 | Ference et al. | 228/180.21 |
| 5,551,148 A * | 9/1996 | Kazui et al. | 29/843 |
| 5,586,175 A | 12/1996 | Hogan et al. | 379/114.14 |
| 5,673,846 A | 10/1997 | Gruber | |
| 5,878,939 A * | 3/1999 | Luchinger et al. | 228/33 |
| 5,971,058 A * | 10/1999 | Bolde et al. | 164/130 |
| 6,029,882 A * | 2/2000 | Bolde et al. | 228/254 |
| 6,231,333 B1 * | 5/2001 | Gruber et al. | 425/546 |
| 6,273,328 B1 | 8/2001 | Maeda et al. | 228/254 |
| 6,378,762 B1 | 4/2002 | Takeuchi et al. | 228/248.1 |
| 6,425,518 B1 | 7/2002 | Gruber et al. | 228/256 |
| 6,454,154 B1 | 9/2002 | Pedigo | 228/33 |
| 6,527,158 B1 * | 3/2003 | Brouillette et al. | 228/33 |
| 2001/0010324 A1 | 8/2001 | Maeda et al. | 228/256 |
| 2002/0109228 A1 | 8/2002 | Buchwalter et al. | 257/738 |
| 2002/0175438 A1 * | 11/2002 | Gruber et al. | 264/102 |
| 2003/0111518 A1 | 6/2003 | Dances | 228/215 |
| 2004/0035917 A1 | 2/2004 | Koopmans | 228/215 |
| 2004/0069840 A1 | 4/2004 | Mackay | 228/248.1 |
| 2004/0164131 A1 * | 8/2004 | Watanabe | 228/261 |
| 2004/0238595 A1 | 12/2004 | Nogiwa et al. | 228/49.5 |
| 2005/0102823 A1 * | 5/2005 | Kim | 29/623 |
| 2006/0231591 A1 * | 10/2006 | Gruber et al. | 228/101 |
| 2007/0057027 A1 | 3/2007 | Bourrieres et al. | 228/248.1 |
| 2007/0272389 A1 * | 11/2007 | Gruber et al. | 164/488 |

(Continued)

OTHER PUBLICATIONS

U.S. Appl. No. 11/869,573, filed Oct. 9, 2007 and entitled "Sprocket Opening Alignment Process and Apparatus for Multilayer Solder Decal".

*Primary Examiner* — Kiley Stoner
(74) *Attorney, Agent, or Firm* — Daniel P. Morris; Ryan, Mason & Lewis, LLP

(57) ABSTRACT

A flexible unitary mask has a plurality of through holes. A substrate has a plurality of wettable pads in recessed regions defining volumes. The through holes are aligned with the wettable pads. Molten solder is directly injected through the through holes of the flexible unitary mask into the volumes with the wettable pads, such that the through holes and the volumes with the wettable pads are filled with solder. The solder is allowed to solidify, forming a plurality of solder structures adhered to the wettable pads. The flexible unitary mask is peeled from the substrate after the solder has solidified.

5 Claims, 20 Drawing Sheets

U.S. PATENT DOCUMENTS

| | | |
|---|---|---|
| 2008/0014406 A1* | 1/2008 | Chey et al. .................... 428/131 |
| 2008/0047680 A1* | 2/2008 | Schultz ......................... 164/133 |
| 2008/0048008 A1* | 2/2008 | Schultz .................... 228/180.22 |
| 2008/0245847 A1* | 10/2008 | Budd et al. .................... 228/253 |
| 2008/0272177 A1 | 11/2008 | Cordes et al. ................. 228/33 |
| 2008/0302860 A1* | 12/2008 | Biggs et al. ................ 228/179.1 |
| 2009/0008057 A1* | 1/2009 | Cordes et al. .............. 164/151.4 |
| 2009/0037016 A1* | 2/2009 | Chainer et al. ................ 700/146 |
| 2009/0039142 A1* | 2/2009 | Bezama et al. ................ 228/249 |
| 2009/0093111 A1* | 4/2009 | Buchwalter et al. .......... 438/614 |
| 2009/0179019 A1* | 7/2009 | Cohen et al. ............. 219/121.85 |
| 2009/0183849 A1* | 7/2009 | Budd et al. ....................... 164/61 |
| 2009/0294090 A1* | 12/2009 | Bouchard et al. ............. 164/262 |
| 2009/0308308 A1* | 12/2009 | Gruber et al. ................. 118/200 |
| 2010/0025862 A1 | 2/2010 | Gruber et al. ................. 257/778 |
| 2010/0025863 A1 | 2/2010 | Gruber et al. ................. 257/778 |
| 2010/0028612 A1 | 2/2010 | Gruber et al. ................. 428/172 |
| 2010/0072263 A1 | 3/2010 | Gruber et al. ................. 228/176 |
| 2010/0084438 A1* | 4/2010 | Biggs et al. ................... 222/590 |
| 2010/0252225 A1* | 10/2010 | Schultz ......................... 164/303 |

* cited by examiner

INJECTION MOLDED SOLDER METHOD FOR FORMING SOLDER BUMPS ON SUBSTRATES

CROSS-REFERENCE TO RELATED APPLICATIONS

This application is a divisional of U.S. patent application Ser. No. 12/269,240, filed Nov. 12, 2008, now U.S. Pat. No. 7,931,187, incorporated by reference herein.

FIELD OF THE INVENTION

The present invention generally relates to the electrical and electronic arts and, more particularly, to injection molded solder techniques.

BACKGROUND OF THE INVENTION

The current manufacturing technology for forming solder bumps on the pads of organic substrates is the solder paste stencil printing method. The stencil printing method of solder paste is suitable for forming solder bumps on the pads of organic substrates at low cost because additional lithography or vacuum processing is not needed. However, due to the significant solder volume reduction after reflow, the stencil printing method cannot be easily extended to fine pitch applications under 150 microns.

Other solder application technologies, such as the microball mounting method, eliminate the volume reduction problem by using preformed solder balls. However, the cost of preformed solder balls significantly increases with size reduction for finer pitch applications, because the uniformity of preformed solder balls decreases as the size of the ball decreases. Difficulties also arise in attempting to form solder bumps on C4 (Controlled Collapse Chip Connection) pads and capacitor pads in a one step process. The capacitor pads need more than 20 times the solder volume of the C4 pads, so an additional stencil printing method is required for the capacitor pads after the ball mounting method forms the solder bumps on the C4 pads.

Injection molded solder (IMS) with double layer decals can be used for forming solder bumps on organic substrates because a protruding solder structure can be created by peeling of one layer decal after the IMS process. U.S. Pat. No. 5,673,846 of Gruber discloses a solder anchor decal and method. A solder decal is produced by a method wherein a decal strip having a plurality of anchor holes is aligned with a mold having a plurality of cells. Liquid solder is injected into the anchor holes and mold cells, and is then allowed to cool to solidify therein. The mold may be separated from the decal strip to form the solder decal containing solder beads each having a stem mechanically joined to the strip at respective ones of the anchor holes. Various forms of the solder decal are used for transferring the solder beads to a substrate or chip, or effecting temporary connections for conducting burn-in and testing, or accommodating thermal mismatch for example.

U.S. Pat. No. 5,244,143 of Ference et al. discloses an apparatus and method for injection molding solder and applications thereof. An apparatus and method are described for injection molding solder mounds onto electronic devices. The apparatus has a reservoir for molten solder which is disposed over a cavity in an injection plate. The injection plate is disposed over a mold having an array of cavities therein into which solder in injection molded. The mold is disposed over a workpiece, such as a semiconductor chip or a semiconductor chip packaging substrate. The cavities in the mold are aligned with electrical contact locations on the chip or substrate. The workpiece is heated and the molten solder is forced under gas pressure into the cavity in the injection plate disposed above the array of cavities in the mold. The molten solder is forced into the array of cavities in the mold. The injection plate is advanced to slide over the mold to wipe away the excess solder above the mold at a plurality of wiping apertures in the injection plate. The injection plate is further advanced to a location having a nonsolder wettable surface at which location the injection plate is removed. The mold is then removed to leave solder mounds disposed on the workpiece. The workpiece can be a semiconductor chip, a semiconductor chip packaging substrate or a dummy substrate onto which the injected molded solder adheres such as a polymer layer to form a carrier substrate for a solder mound array which can be subsequently transferred to a substrate such as a semiconductor chip or a semiconductor chip packaging substrate. The apparatus and methods of the invention can be integrated into an automated manufacturing system for depositing an array of solder mounds onto a substrate.

SUMMARY OF THE INVENTION

Principles of the present invention provide techniques for forming solder bumps on substrates using injection molded solder. An exemplary method includes the steps of obtaining a flexible unitary mask having a plurality of through holes; obtaining a substrate having a plurality of wettable pads in recessed regions defining volumes; aligning the through holes with the wettable pads; directly injecting molten solder through the through holes of the flexible unitary mask into the volumes with the wettable pads, such that the through holes and the volumes with the wettable pads are filled with solder; allowing the solder to solidify, whereby the solder forms a plurality of solder structures adhered to the wettable pads; and peeling the flexible unitary mask from the substrate after the solder has solidified.

An exemplary apparatus is provided for forming solder structures on a substrate having a plurality of wettable pads in recessed regions defining volumes. The apparatus includes a flexible unitary mask having a plurality of through holes; a substrate carrier configured to receive the substrate; an alignment stage configured to align the through holes with the wettable pads; an injection molded solder head configured to directly inject molten solder through the through holes of the flexible unitary mask into the volumes with the wettable pads, such that the through holes and the volumes with the wettable pads are filled with solder; a cooling stage which allows the solder to solidify, whereby the solder forms the plurality of solder structures, adhered to the wettable pads; and a take-up member configured to peel the flexible unitary mask from the substrate.

These and other objects, features and advantages of the present invention will become apparent from the following detailed description of illustrative embodiments thereof, which is to be read in connection with the accompanying drawings (note that section lining is omitted from the drawings, except with respect to mask 102, in order to avoid clutter).

DETAILED DESCRIPTION OF PREFERRED EMBODIMENTS

Figure 1:
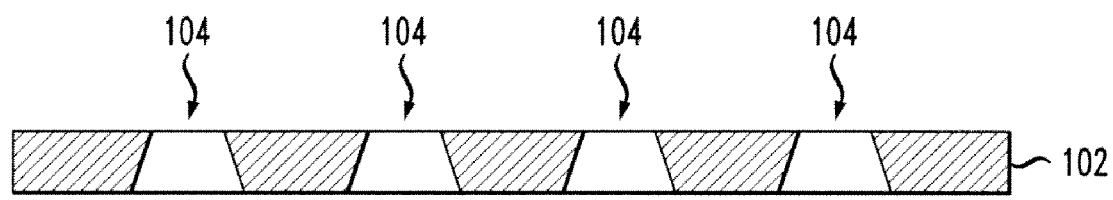
FIG. 1 depicts a mask, according to an aspect of the invention.
Figure 2:
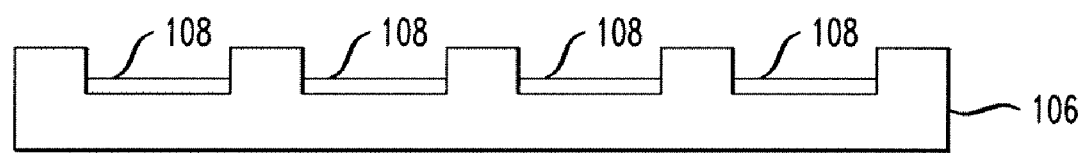
FIG. 2 depicts an organic substrate, according to another aspect of the invention.

Aspects of the invention relate to the injection molder solder (IMS) process for semiconductor packages, and provide a method for forming solder bumps on the pads of package substrates. Embodiments of the invention may offer one or more of the following advantages: reduced alignment steps and improved solder transfer yield, as compared to other techniques, as well as ability to form solder bumps on fine pitch substrates under 150 microns (although the invention is not limited to this value). Thus, one or more instances of the invention provide a method and apparatus for forming solder bumps on organic substrates, suitable for fine pitch applications, whereby molten solder is injected into a mask which is aligned on a substrate.

In one or more embodiments of the invention:
only one layer of decal (mask) is needed,
the IMS head has a scanned solder slot for any size array, continuous wiping is employed, with solder injection pressure, using a greatly reduced area wiper,
PI (Polyimide) sheets follow substrate non-flat contours, thus requiring compliant head coatings, and the compliance materials under the IMS head deform to match the topography of the substrate's surface, enabling good contact between the decal (mask) and organic substrate and avoiding solder leakage, and/or
PI sheet removal can be carried out when the solder is solidified by peeling (rolling) removal to minimize stress on metallurgical joints—the tapered angle of holes in the mask (frustoconical shape) helps easy separation of the mask after solder solidification and decreases mask hole deformation and increases the life time of the decal (mask).

Note that a "scanned solder slot" means that there is relative motion between the solder head and the cavities which will receive the molten solder. In the exemplary embodiment described herein, the mask and substrates move while the solder head is stationary; the solder is dispensed from a linear slot which covers less than all the rows of cavities. Note that in other embodiments, the solder head may move while the other components are stationary.

Note also that "continuous wiping" refers to the trailing edge (trailing in terms of relative motion) of the solder head wiping away the solder from above the mask, at the same speed as the solder head itself, and ensuring that the only solder remaining is within the cavities. Further, with regard to reduced area, wiping quality improves as the pressure (force per unit area) between the head and mask increases. Inadequate wiping can cause bridging between cavities, with a resultant short. The reduced contact area, for a comparable normal force between the head and mask, results in increased pressure and enhanced wiping compared to techniques wherein the fill head extends over the entire workpiece. In a non-limiting example, the pressure is about 10 to about 60 pounds per square inch (PSI) with a preferred value of about 15 PSI (about 68.9 to about 414 kilo-Pascals with a preferred value of about 103 kilo-Pascals).

Figure 3:
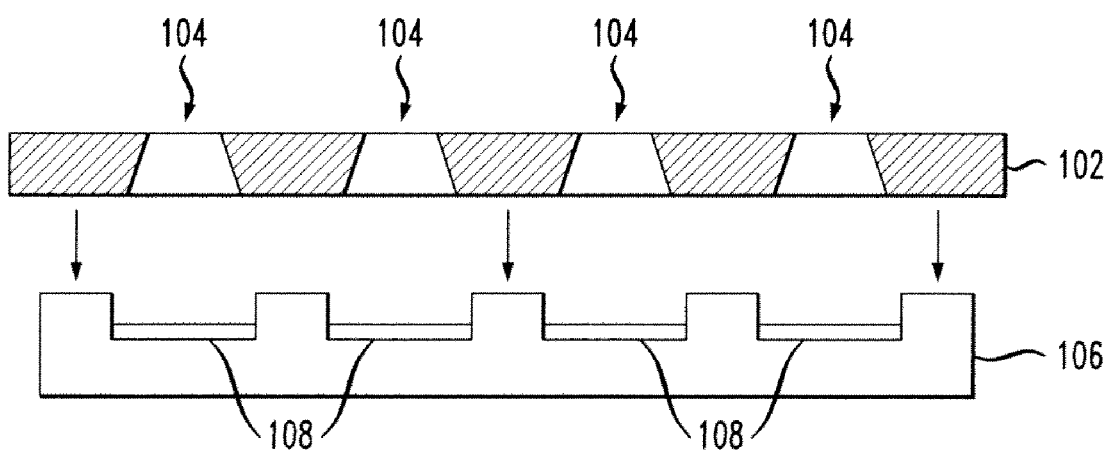
FIG. 3 depicts an alignment process between the mask and substrate.
Figure 4:
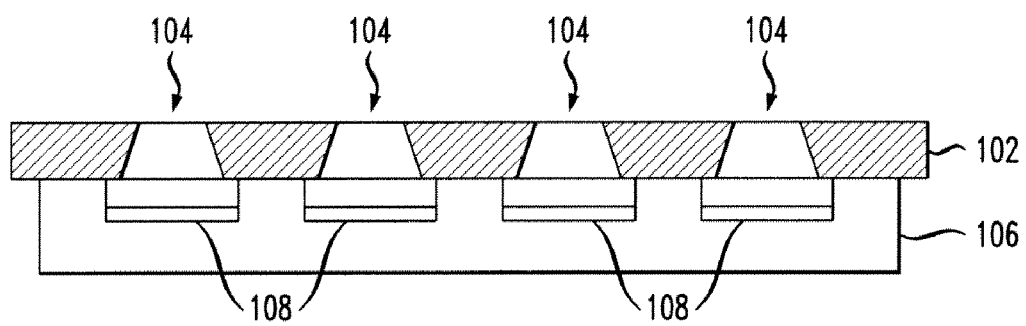
FIG. 4 depicts the aligned mask and substrate, ready for solder injection, according to a further aspect of the invention.

Attention should now be given to FIGS. 1-4. As seen therein, a mask 102 includes a plurality of through holes 104 arranged in a desired pattern. The mask 104 is located adjacent a substrate 106. The substrate may be, for example, an organic substrate with a plurality of wettable pads 108 (for example, copper, gold, nickel, and the like) located in recesses. The mask may be, for example, a polyimide film or a thin material that does not react with solder (e.g., non-wetting metals such as molybdenum, stainless steel, aluminum, and the like). As shown in FIG. 3, the mask 102 is aligned to the substrate 106 so that holes 104 align with pads 108. Note that holes 104 are preferably not of uniform diameter, but rather frustoconical, with the larger diameter adjacent substrate 106 as seen in FIG. 4. The assembly in FIG. 4 is ready to receive solder.

Non-limiting examples of organic substrates include laminate materials made of glass fibers in an epoxy; for example, FR-4 (flame retardant type 4) and BT-resin (Bismaleimide Triazine resin). Furthermore, it should be noted that the invention is not limited to organic substrates; element 106 is also representative of a silicon wafer, as aspects of the invention can also be employed to create solder bumps on silicon wafers. Thus, the wettable pads 108 depicted in the figures represent wettable pads also encompass ball-limiting metallurgy, in the case of a silicon substrate.

Figure 5:
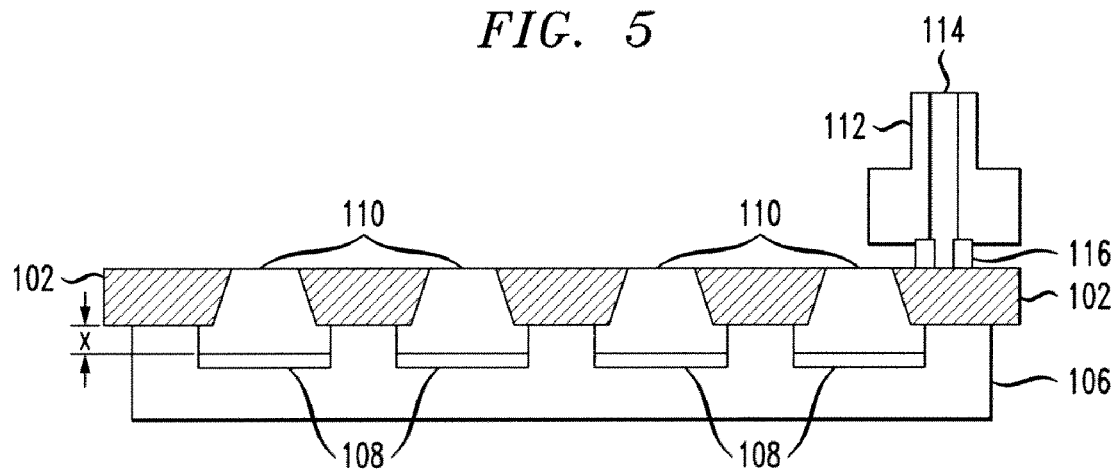
FIG. 5 depicts the aligned mask and substrate after solder injection.
Figure 6:
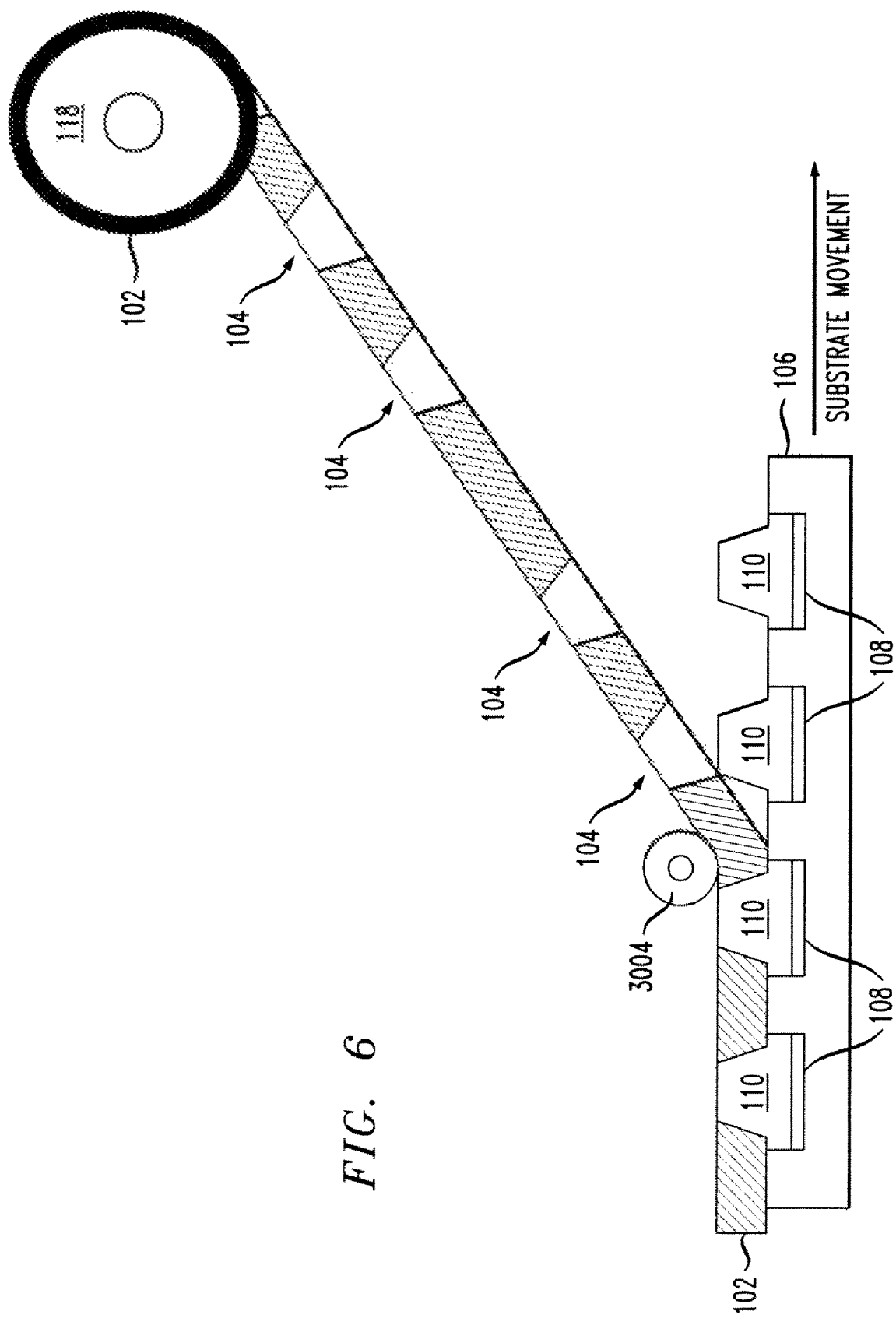
FIG. 6 depicts mask separation.
Figure 7:
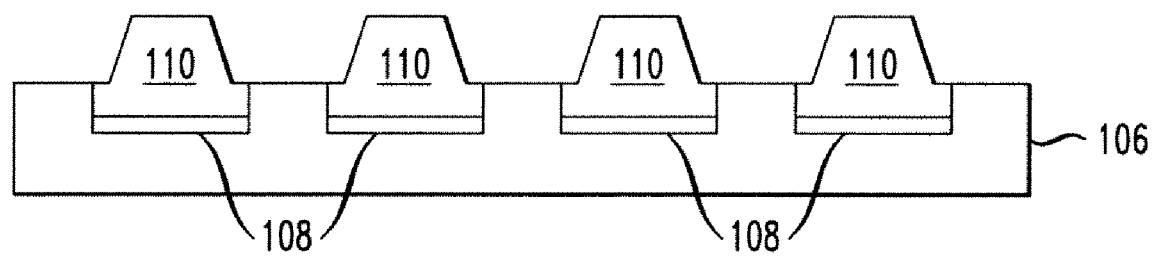
FIG. 7 depicts the solder bumps after mask removal.
Figure 8:
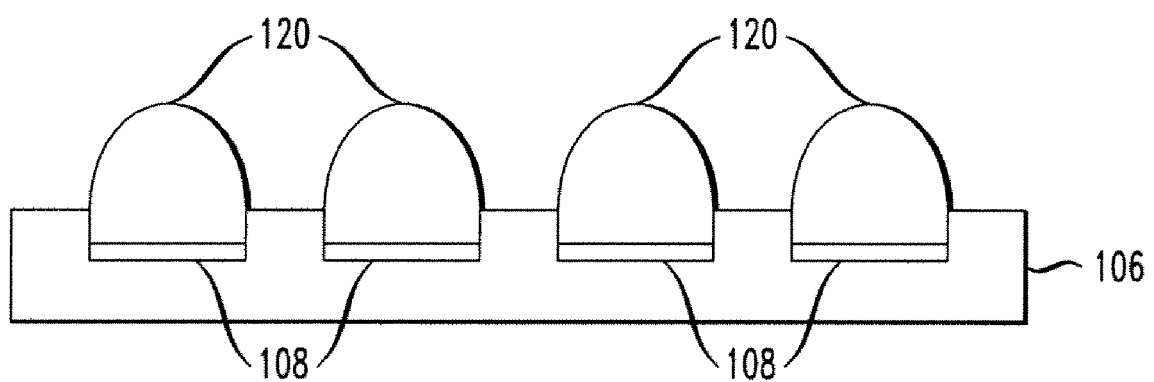
FIG. 8 depicts the structure after an optional reflow process.

A solder fill process is shown in FIG. 5, wherein fill head 112 dispenses solder 114 into the holes 104 and the recessed regions with pads of wettable material 108 to form solder structures 110. As best seen in FIG. 5, the recessed regions may be such that the top surface of the pads of wettable material is recessed below the top surface of the substrate 106 by a distance X of about 5-15 microns. This results in a "shoulder" of solder material. Fill head 112 is provided with compliant material 116 for purposes to be discussed below. As seen in FIG. 6, after solder solidification, the mask 102 (also referred to herein as a "decal" or "decal layer") is peeled away onto a reel 118 with the aid of a peel roller 3004 (discussed further below). Because holes 104 are frustoconical with the wide side towards substrate 106, they are not re-entrant, and decal 102 peels relatively easily, without undue mechanical stress on structures 110 or substrate 106. Optionally, as seen in FIG. 8, a reflow process is conducted such that solder structures 110 become substantially hemispherical solder bumps 120.

Figure 9:
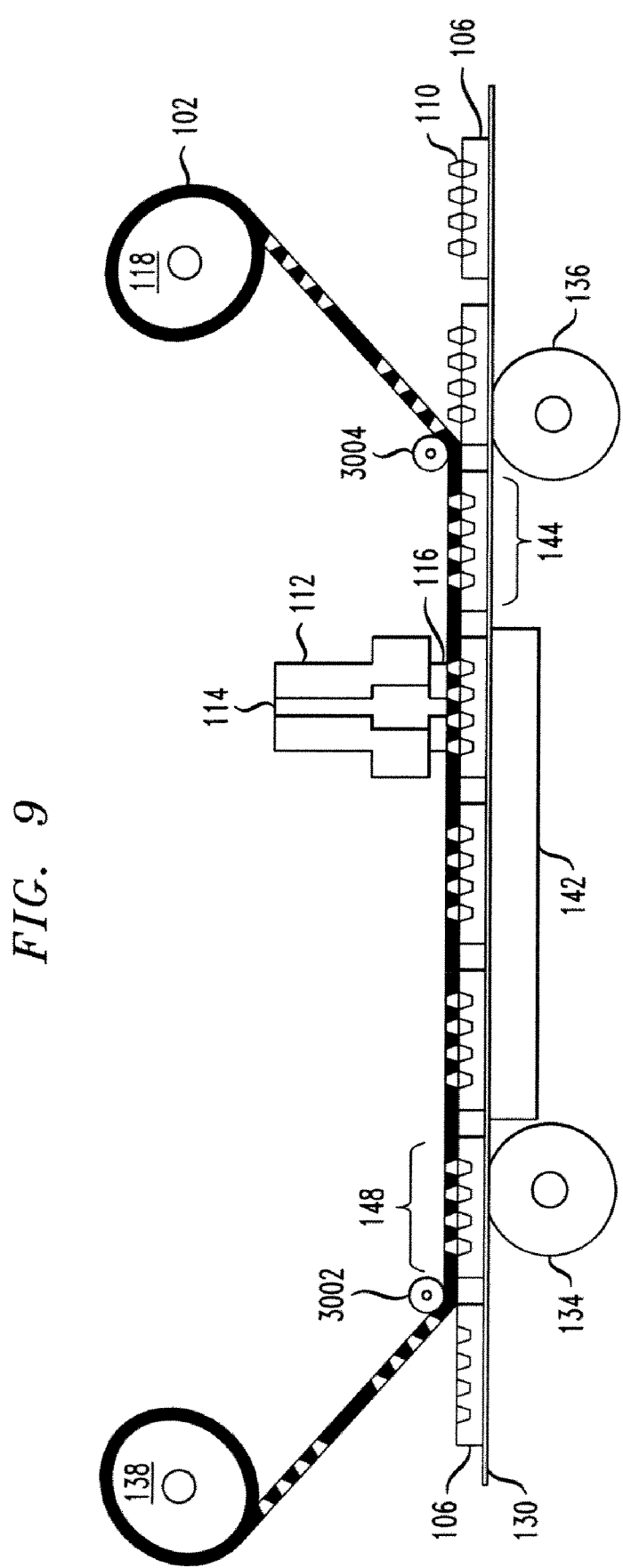
FIGS. 9 and 10 show side and top views, respectively, of an exemplary automated solder bumping process, according to still another aspect of the invention.
Figure 10:
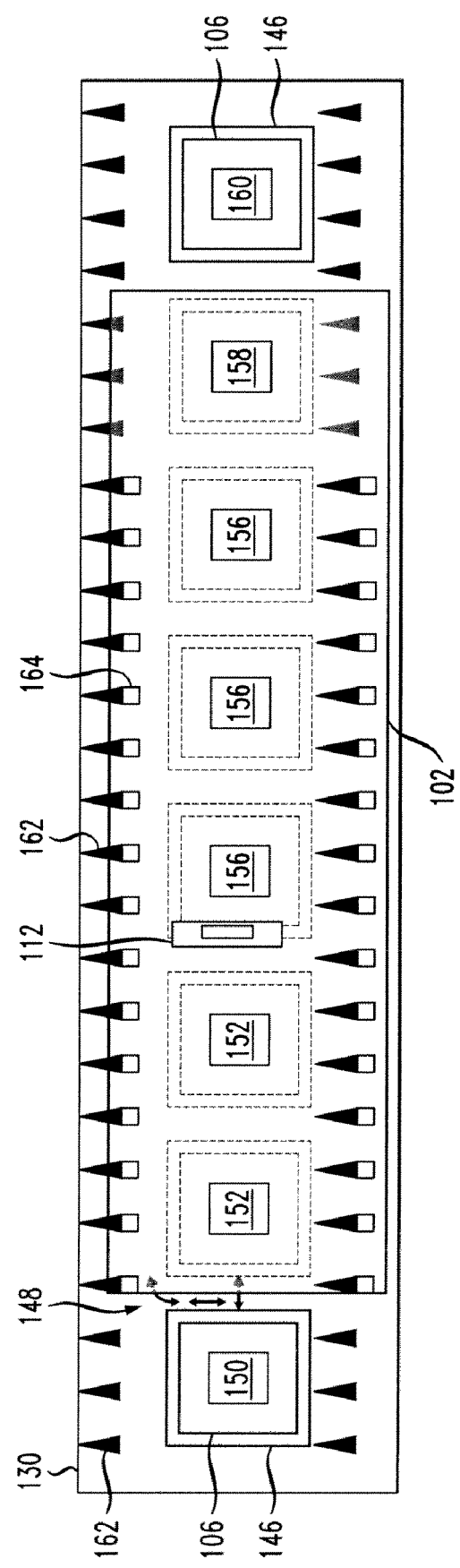

FIGS. 9 and 10 show a non-limiting example of a production scheme for the techniques shown in FIGS. 1-8. Mask (decal) 102 is provided with a take up reel 118 and feed reel 138. A plurality of substrates 106 are carried on substrate carrier 130, which can be moved by rollers 134, 136, for example. Each individual substrate 106 is provided with a base plate 146. Relative X, Y, and Theta motion (two degrees of translational freedom and one degree of rotation freedom) is provided between base plate 146 and decal 102 for alignment purposes in alignment region 148. A hot stage is provided at 142 to ensure that the temperature of substrate 106 is between about 150 degrees Centigrade and about the solder melting point, prior to fill head 112 with compliant material 116 dispensing solder 114. Subsequent cooling takes place in cooling zone 144, after which decal 102 is peeled away from the substrates 106 exposing solder structures 110 thereon.

In some cases, carrier 130 may be in the form of a series of tread links, similar to those used for earth moving equipment and military tank tracks, with one link for each plate 146. Plates 146 may move with respect to carrier 130 for alignment purposes.

In addition to supply reel 138, a supply roller 3002 may be provided to urge the mask 102 against the substrates 106. Furthermore, in addition to take-up reel 118, a peel roller 3004 may be provided to aid in peeling mask 102 from substrates 106.

Alignment may be carried out, for example, in region 148 using, for example, optical techniques (since in one or more embodiments, the decal 102 is transparent). Decal 102 may be provided with a plurality of holes 164 which are engaged by pins 162 on carrier 130 to impart motion from carrier 130 to film 102. While FIG. 9 is a side elevation view and FIG. 10 is a top plan view, pins 162 are shown in side view in FIG. 10 for illustrative clarity. A pin need not necessarily be provided for every hole; for example, there could be one pin for every 5 holes.

At region 150, the pads with wettable material 108 in the substrate 106 are empty. At regions 152, the decal is adjacent the substrates and empty holes 104 are present. At regions 156, solder fill has taken place, while at region 158, the decal peels away; its through holes 104 are now empty and the substrate 106 with solder structures 110 is visible at region 160.

Figure 11:
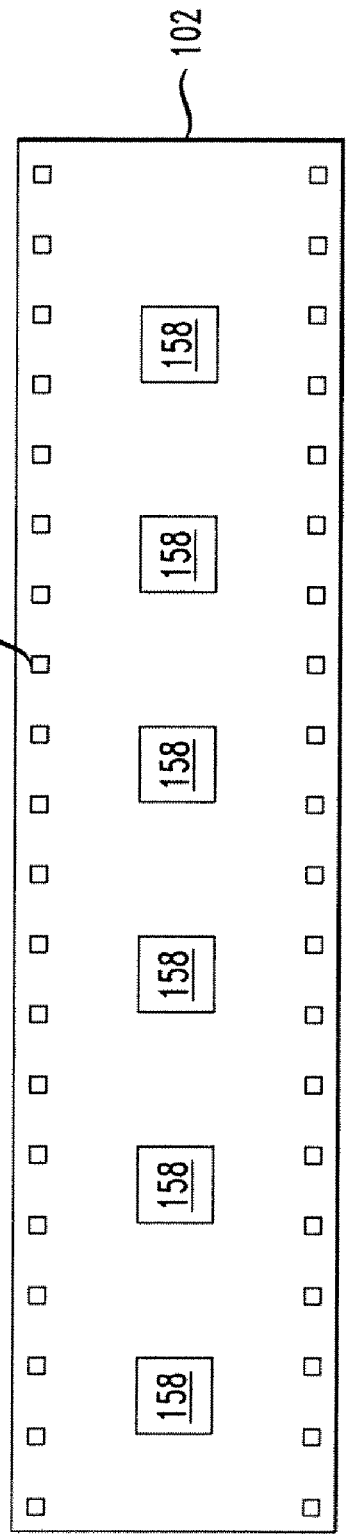
FIGS. 11 and 12 show, respectively, top views of a mask and a substrate carrier suitable for use in the process of FIGS. 9 and 10.
Figure 12:
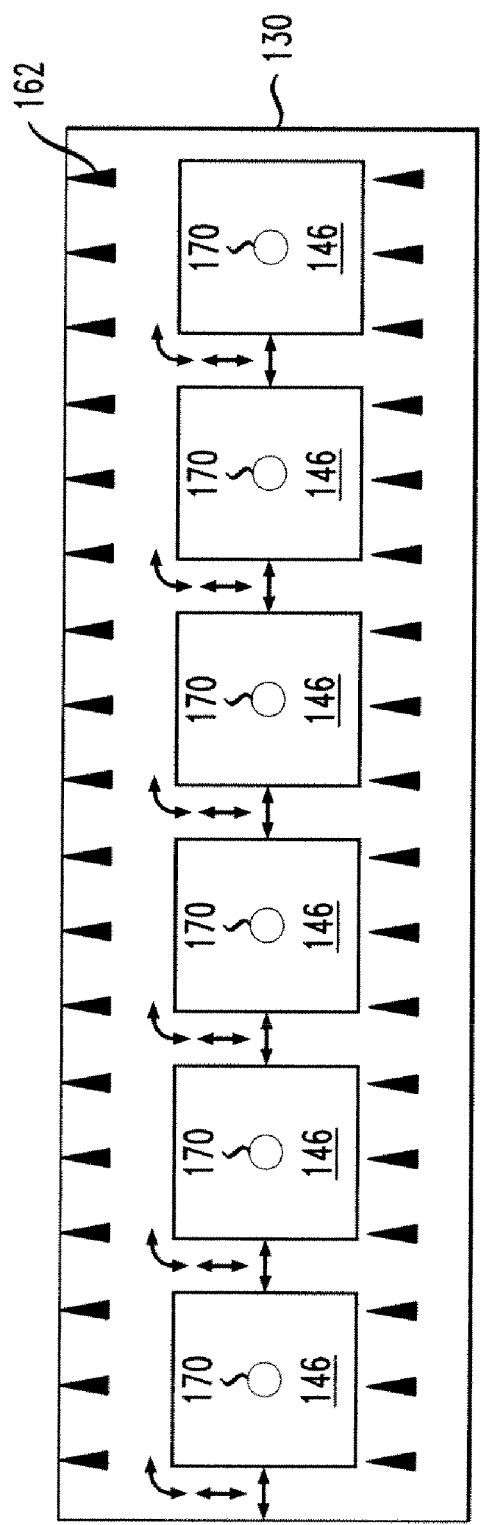

FIG. 11 shows a top view of mask or decal 102 including holes 164 to receive pins 162 for motion, as well as patterns 158 with empty through holes 104. FIG. 12 shows a top view of substrate carrier 130 including motion pins 162 and individual base plates 146 capable of X, Y, and Theta motion as described above for alignment of the patterns between the mask 102 and each substrate 106. Vacuum holes 170 may be provided to secure substrates 106 after alignment.

Figure 13:
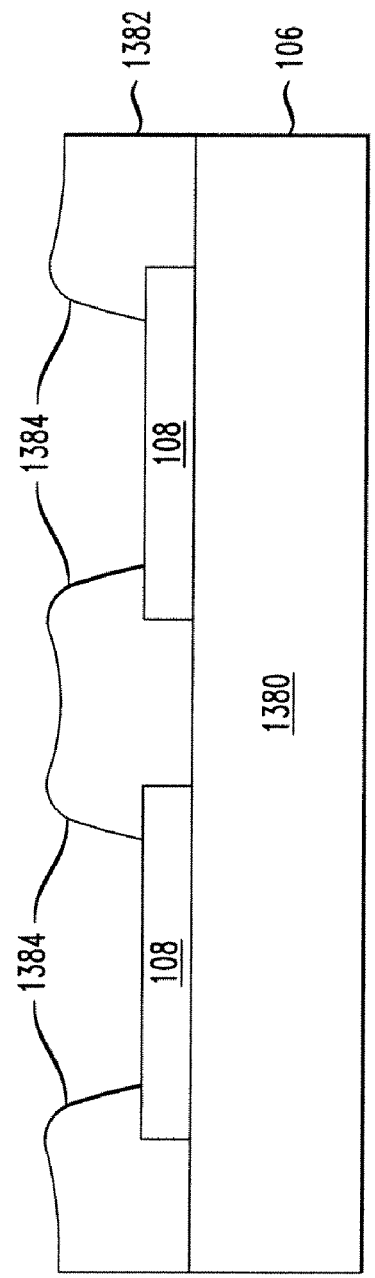
FIGS. 13-15 demonstrate the role of compliant material on a solder head, according to yet another aspect of the invention.
Figure 14:
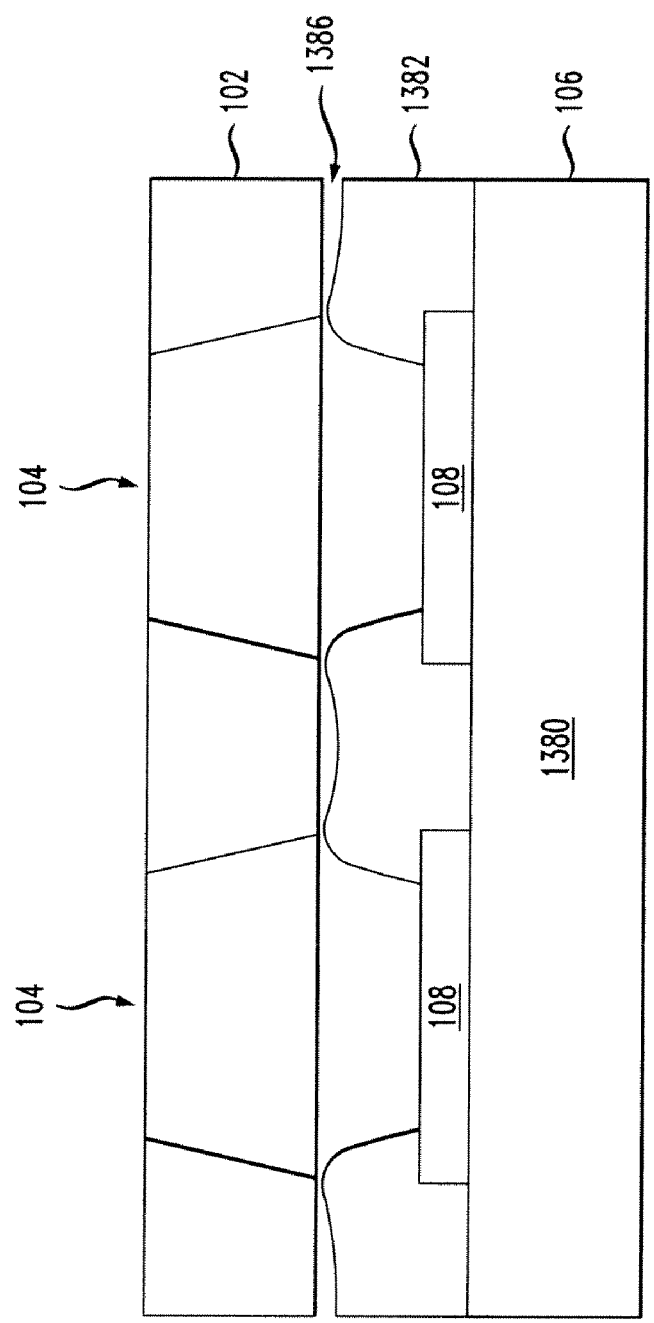
Figure 15:
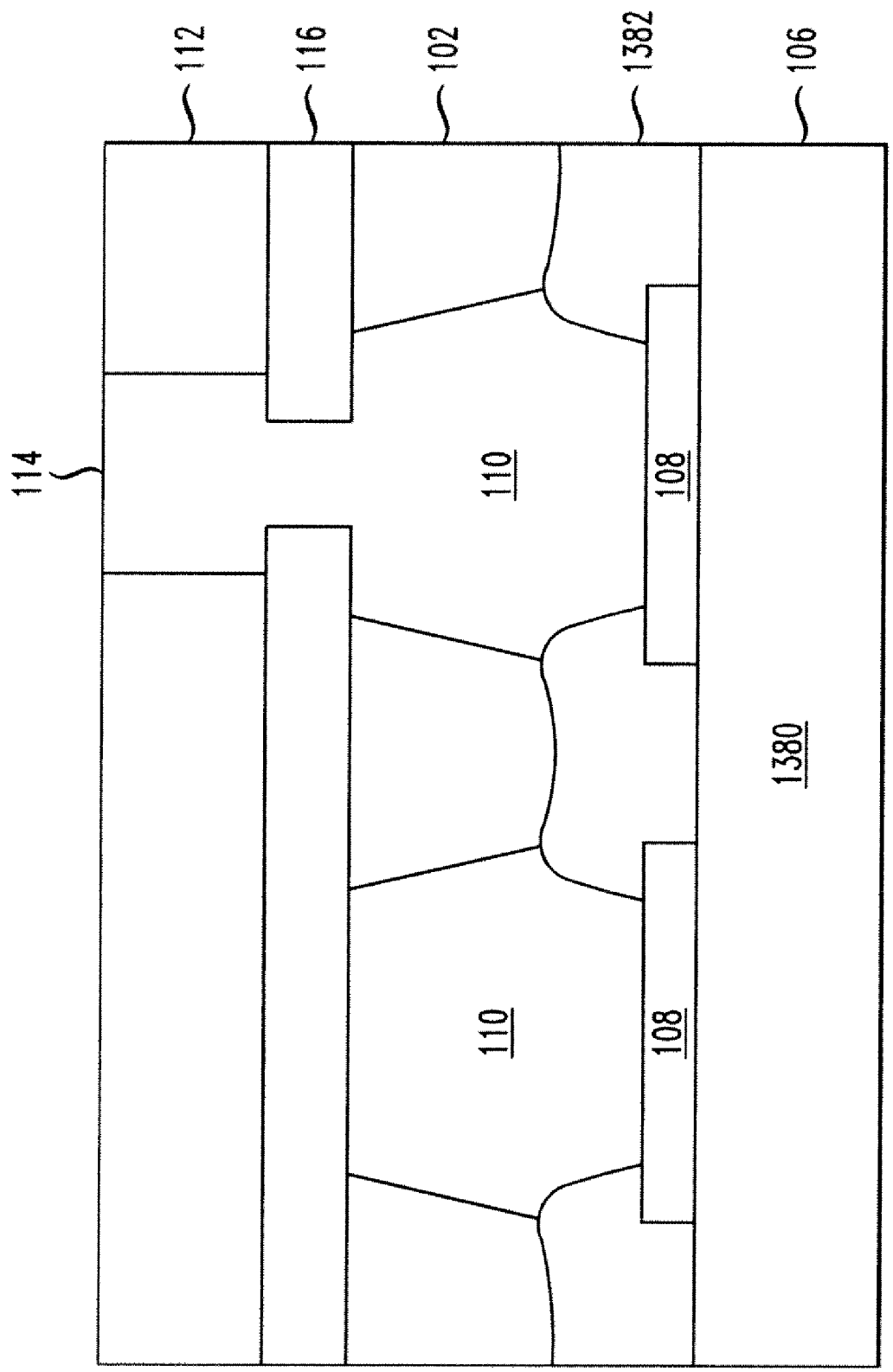

FIGS. 13-15 present exemplary aspects of the invention associated with compliant material 116. As seen in FIG. 13, substrate 106 may be formed, for example, from base substrate 1380 with solder resist (SR) 1382. Wettable pads (e.g., copper) are shown at 108. The upper surface of solder resist 1382 is not perfectly flat, but includes topographical features 1384. As best seen in FIG. 14, these will prevent a perfect seal with decal mask 102, thus resulting in a small gap 1386 with concomitant leakage of solder during the IMS process. As shown in FIG. 15, fill head 112, which may be, for example, glass or metal, is provided with compliant material 116, which spreads out (distributes uniformly, or nearly so) the compressive force between (i) head 112 and (ii) decal 102 on substrate 106, resulting in good contact between mask 102 and substrate 106, such that gaps that would cause undesirable leakage are reduced or eliminated. The mask 102 is sufficiently flexible to track the topography 1384 of the substrate 106, under the influence of the compressive force that is distributed by compliant material 116.

Compliant material 116 may include, for example, a bulk compressible layer with a thin low-friction layer adjacent mask 102. Non-limiting examples of compliant materials for the bulk compressible layer are silicone rubber and silicone closed cell sponge. Non-limiting examples of materials for the low-friction layer are fluoropolymers such as Teflon® (registered mark of E. I. Du Pont De Nemours And Company, Wilmington, Del., USA) and Rulon® TFE Fluorocarbon (registered mark of Saint-Gobain Performance Plastics Corporation, Aurora, Ohio USA). The low-friction layer may be just thick enough to resist abrasion, for example. The total thickness of the low friction layer plus the bulk compressible layer may be, for example, from about 1/32 inch to about 1/4 inch, with a preferred thickness of about 1/16 inch (from about 0.79 mm to about 6.35 mm, with a preferred thickness of about 1.59 mm). As noted elsewhere, the contact pressure may be about 10 to about 60 pounds per square inch (PSI) with a preferred value of about 15 PSI (about 68.9 to about 414 kilo-Pascals with a preferred value of about 103 kilo-Pascals).

Figure 17:
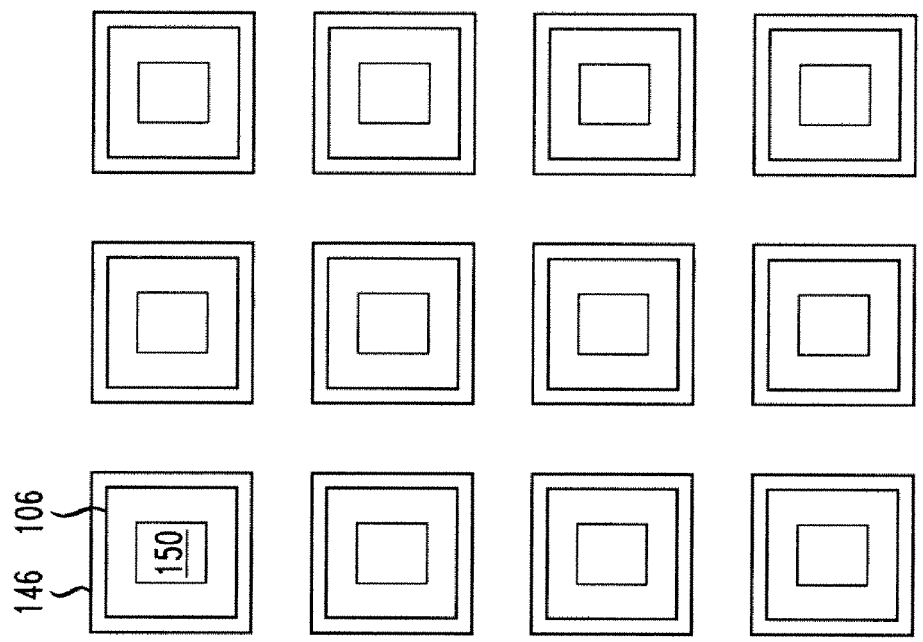
FIGS. 16-21 show steps in an IMS substrate bumping method with a large size mask and individual substrate.
Figure 16:
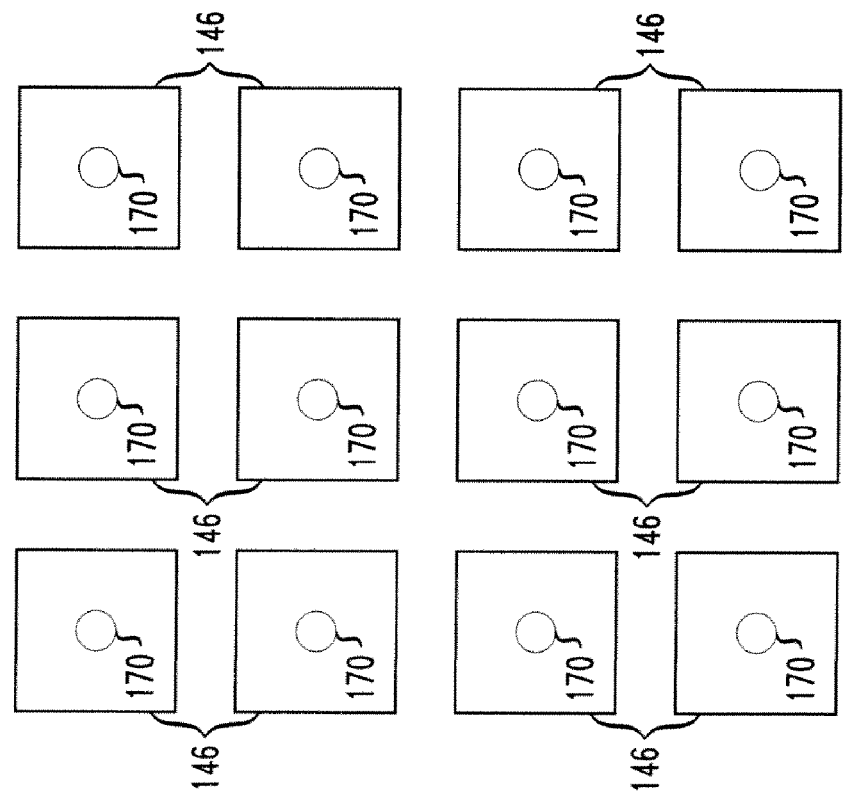
Figure 19:
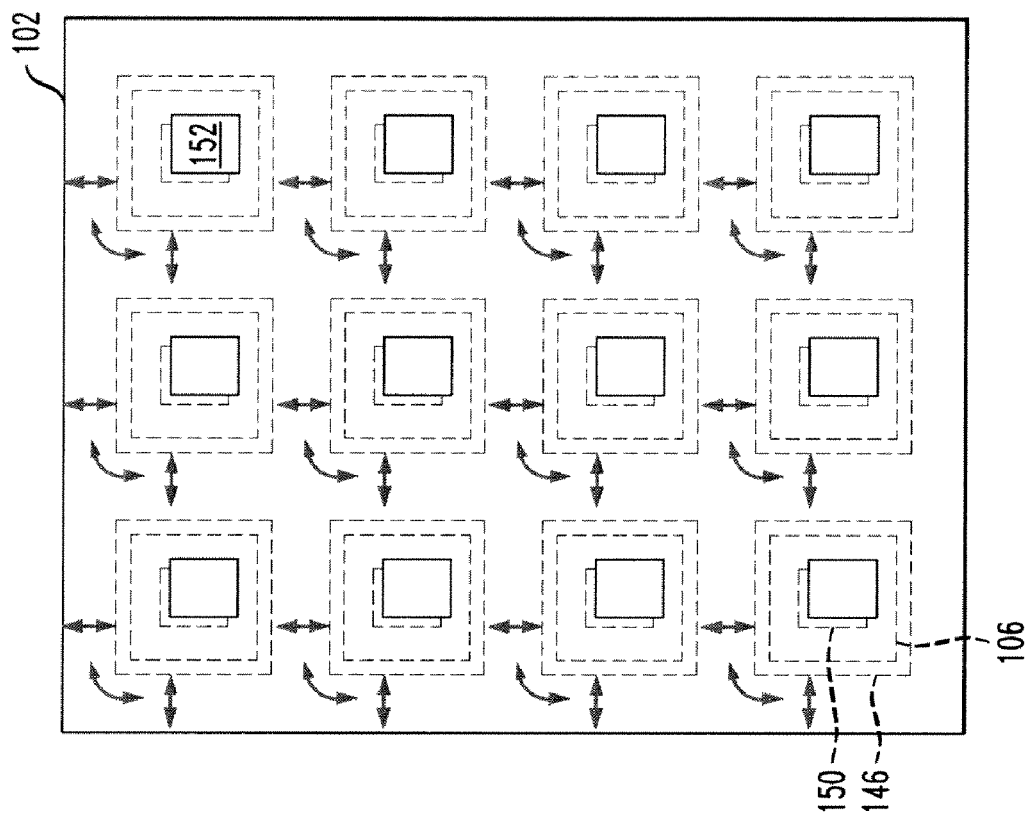
Figure 18:
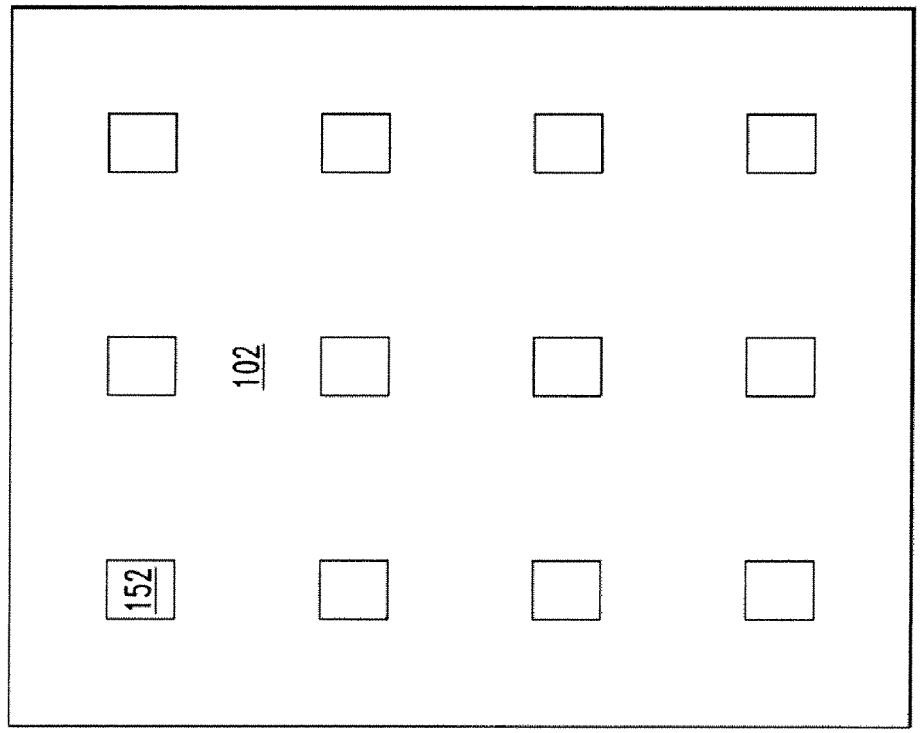
Figure 21:
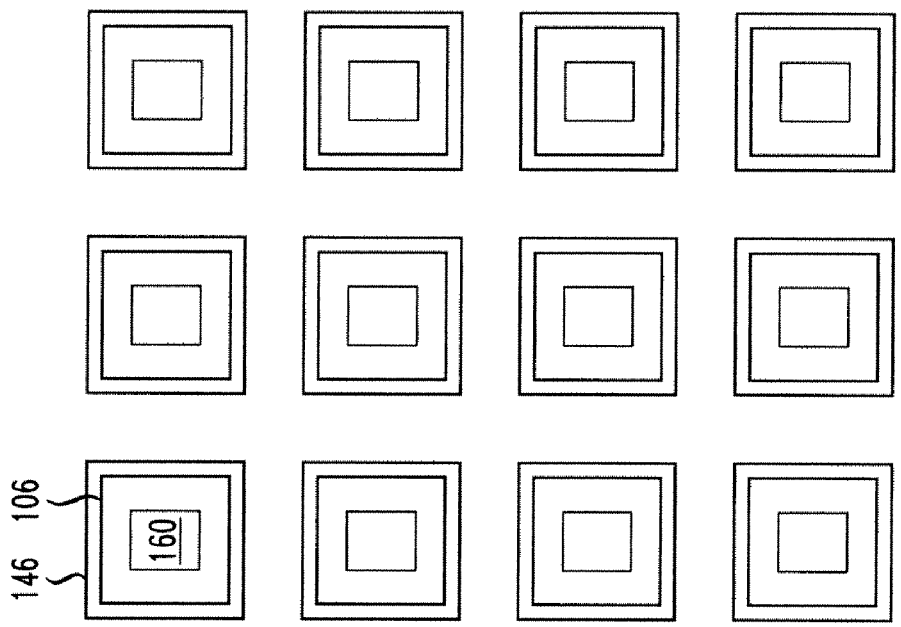
Figure 20:
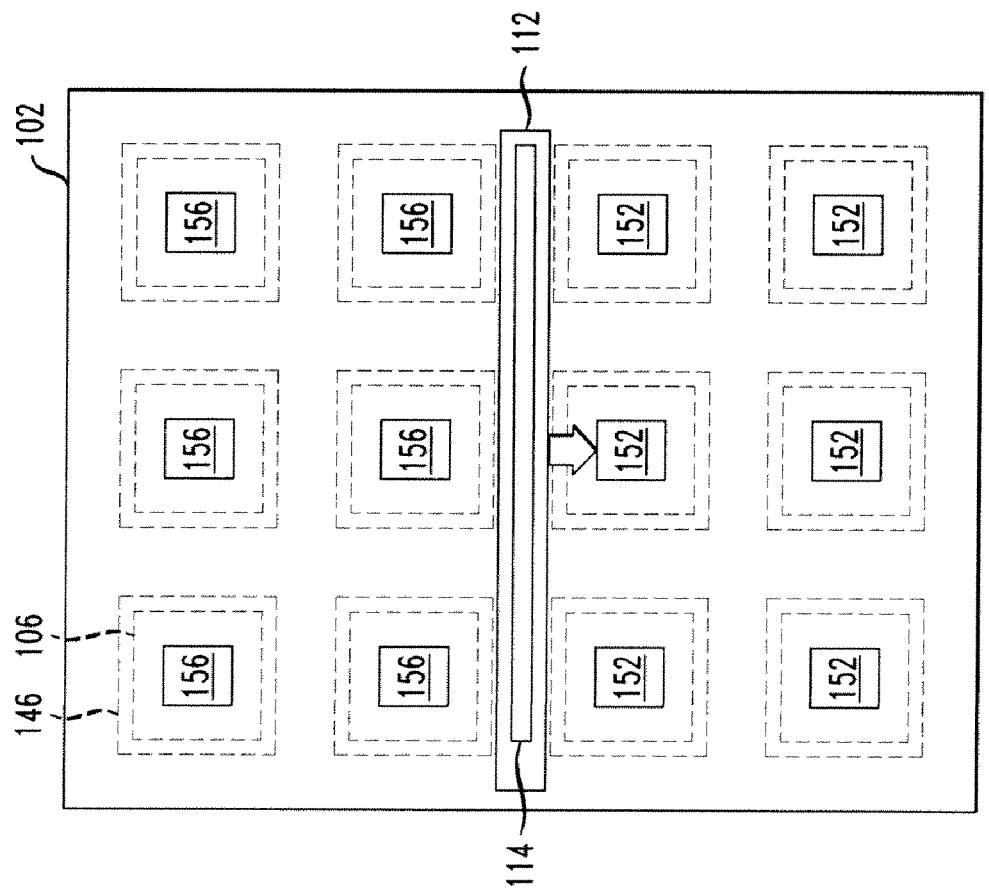

FIGS. 16-21 depict an IMS substrate bumping method, according to an aspect of the invention, employing a relatively large size mask 102 and individual substrates 106. As seen in FIG. 16, a plurality of individual base plates 146 are provided, each with a vacuum hole 170. FIG. 17 shows a plurality of substrates 106 with the pads of wettable material 108 empty, at 150. FIG. 18 shows mask 102 with a plurality of through hole patterns 152. FIG. 19 shows the individual alignment process wherein each base plate 146 has X, Y, and Theta motion. FIG. 20 shows solder fill head 112 with solder 114 moving across decal 102 as indicated by the large arrow (this is relative motion; head 112 may be stationary with decal 102 moving opposite the large arrow). Solder fill has taken place at regions 156 while regions 152 are in condition for fill but not yet filled. FIG. 21 shows the substrates 106 on base plates 146, with solder structures 110 present in regions 160.

Figure 23:
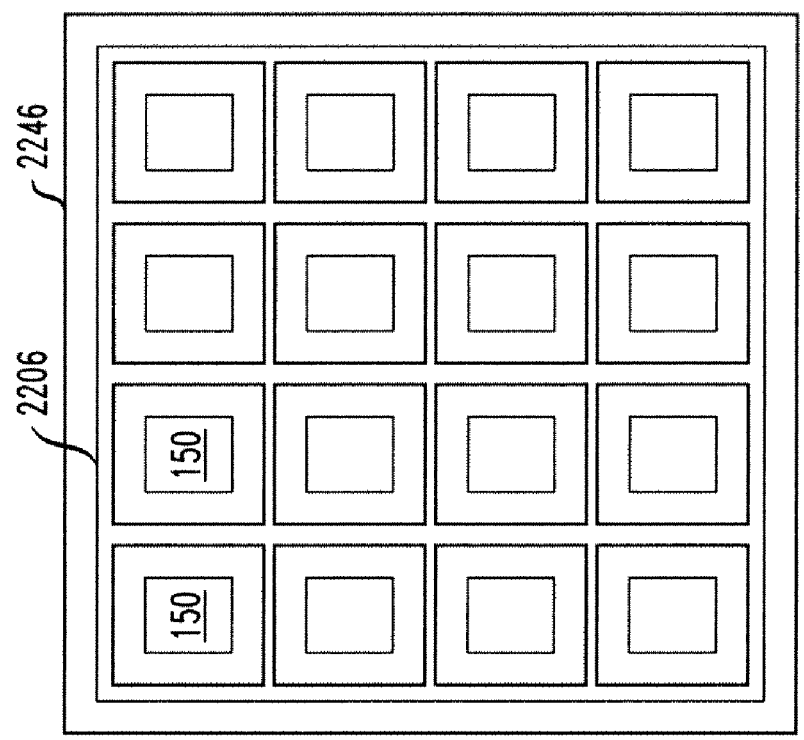
FIGS. 22-27 show steps in an IMS substrate bumping method with a large size mask and panel size substrate.
Figure 22:
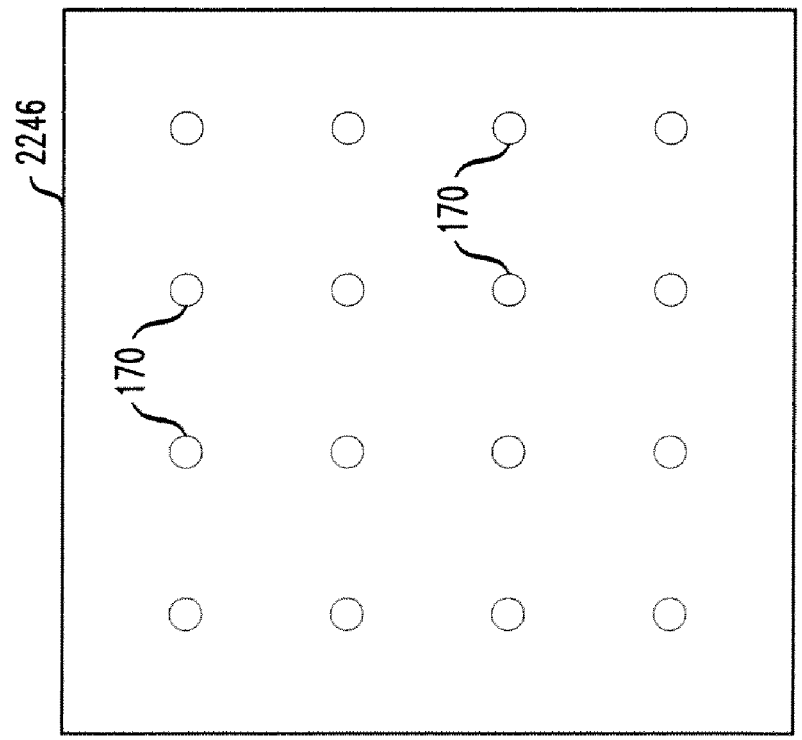
Figures 24, 25:
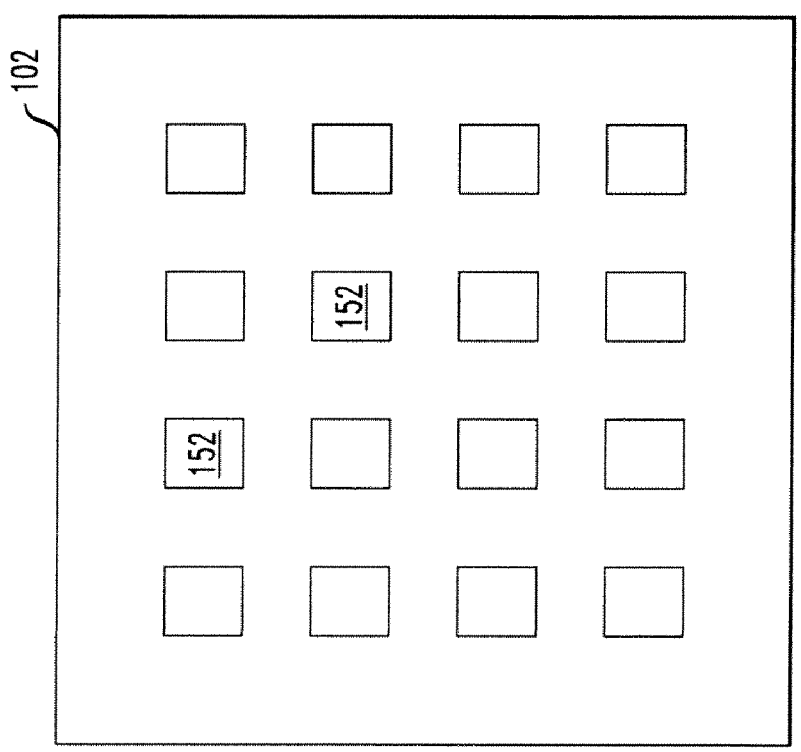
Figure 27:
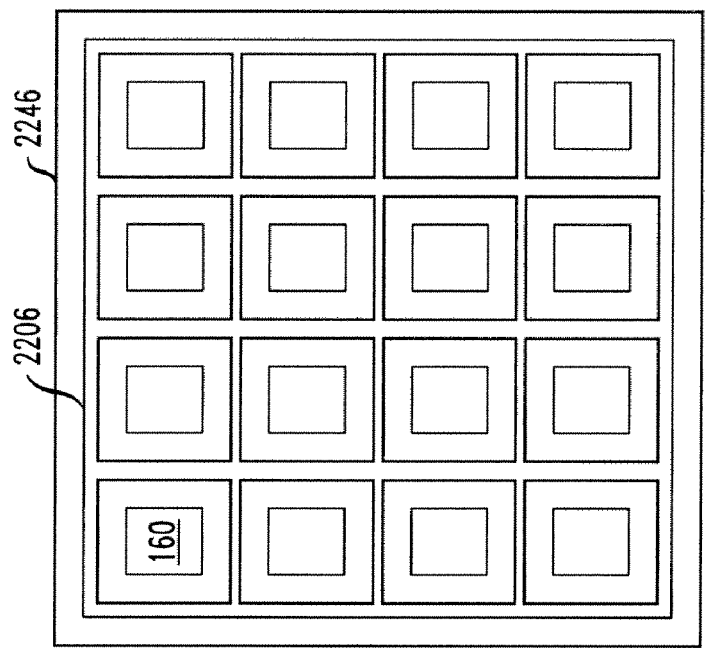
Figure 26:
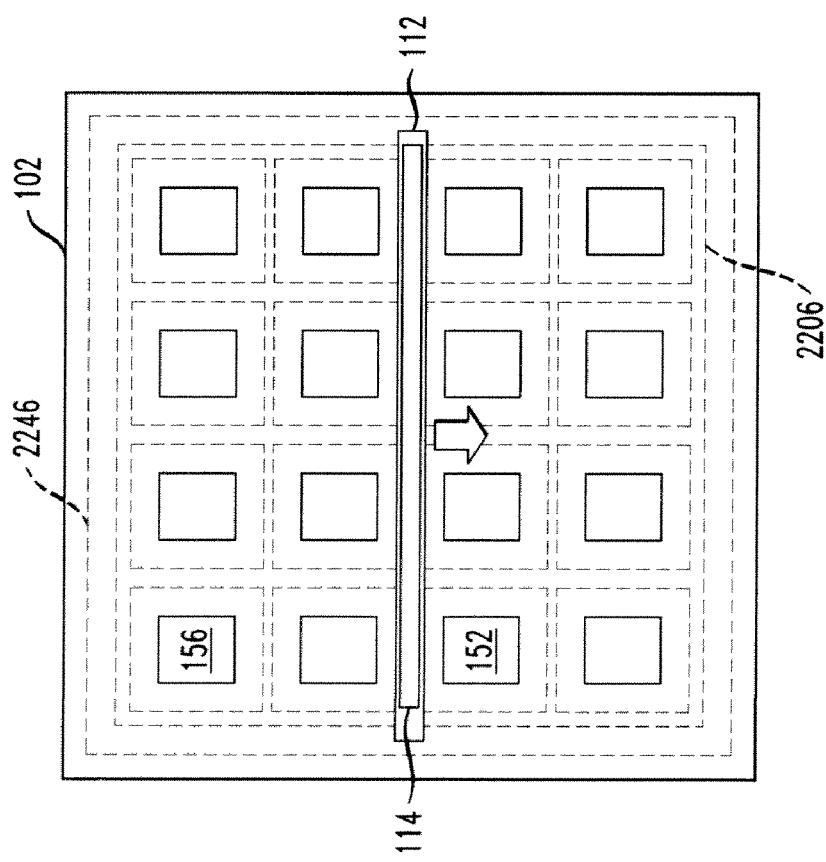

FIGS. 22-27 depict an IMS substrate bumping method, according to another aspect of the invention, employing a relatively large size mask 102 and a panel size substrate 2206. As seen in FIG. 22, a base plate 2246 is provided with a plurality of vacuum holes 170. FIG. 23 shows a single panel-type substrate 2206 with the pads of wettable material 108 empty, at 150. FIG. 24 shows mask 102 with a plurality of through hole patterns 152. FIG. 25 shows the alignment process wherein the single base plate 2246 has X, Y, and Theta motion for global alignment with the mask 102. FIG. 20 shows solder fill head 112 with solder 114 moving across decal 102 as indicated by the large arrow (this is relative motion; head 112 may be stationary with decal 102 moving opposite the large arrow). Solder fill has taken place at regions 156 while regions 152 are in condition for fill but not yet filled. FIG. 27 shows the substrate 2206 on base plates 2246, with solder structures 110 present in regions 160.

Note that in general, for all the exemplary embodiments, vacuum is only applied after alignment is complete.

Figure 28:
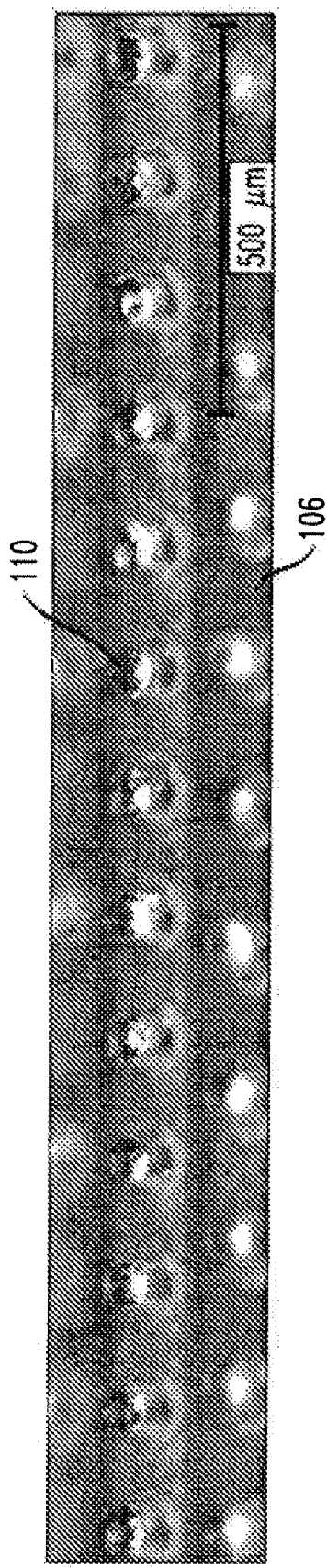
FIGS. 28-35 show non-limiting exemplary experimental results.
Figure 29:
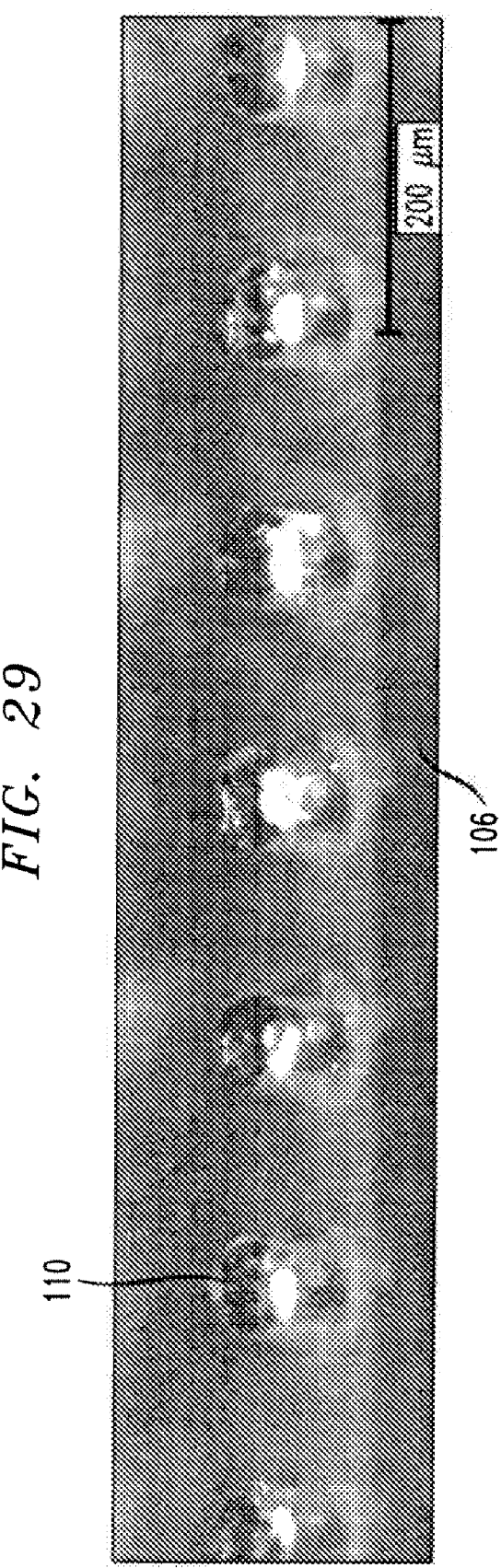
Figure 30:
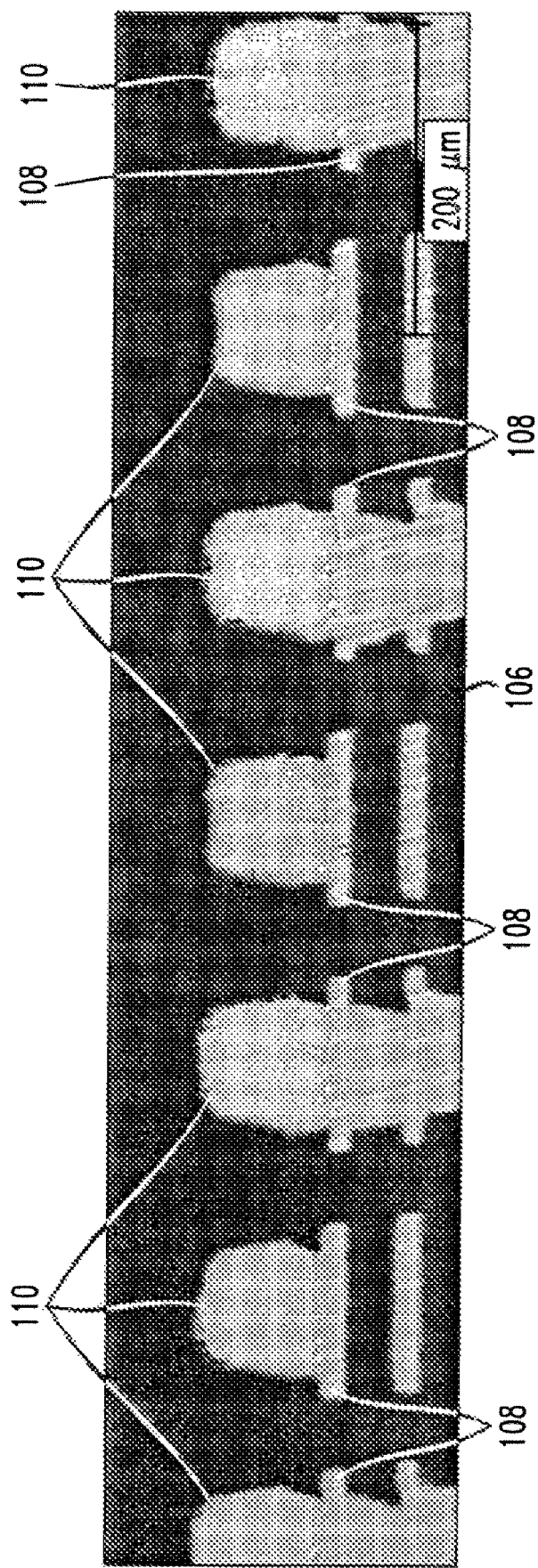
Figure 32:
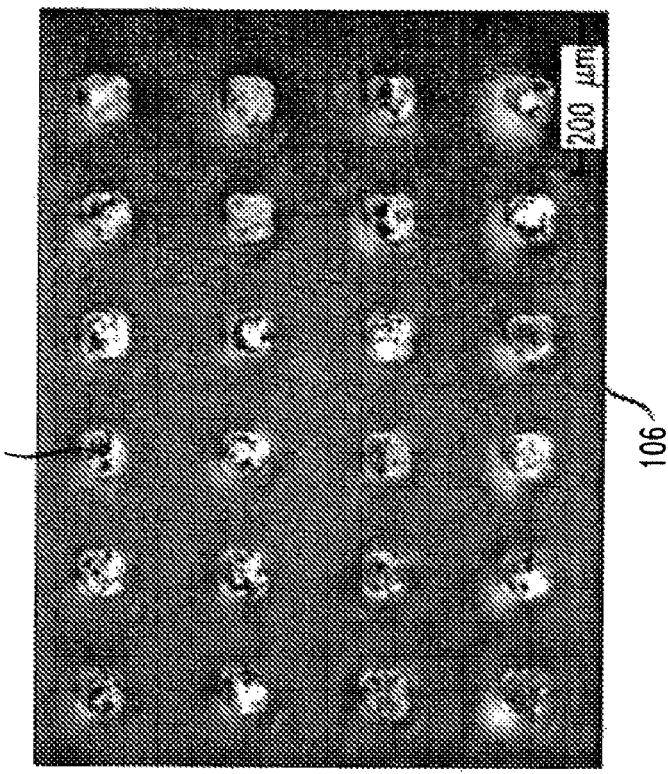
Figure 31:
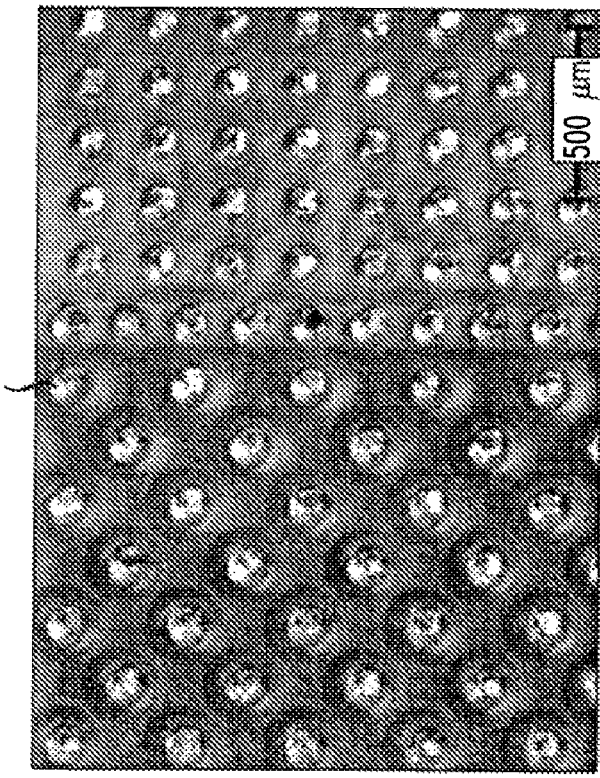
Figure 33:
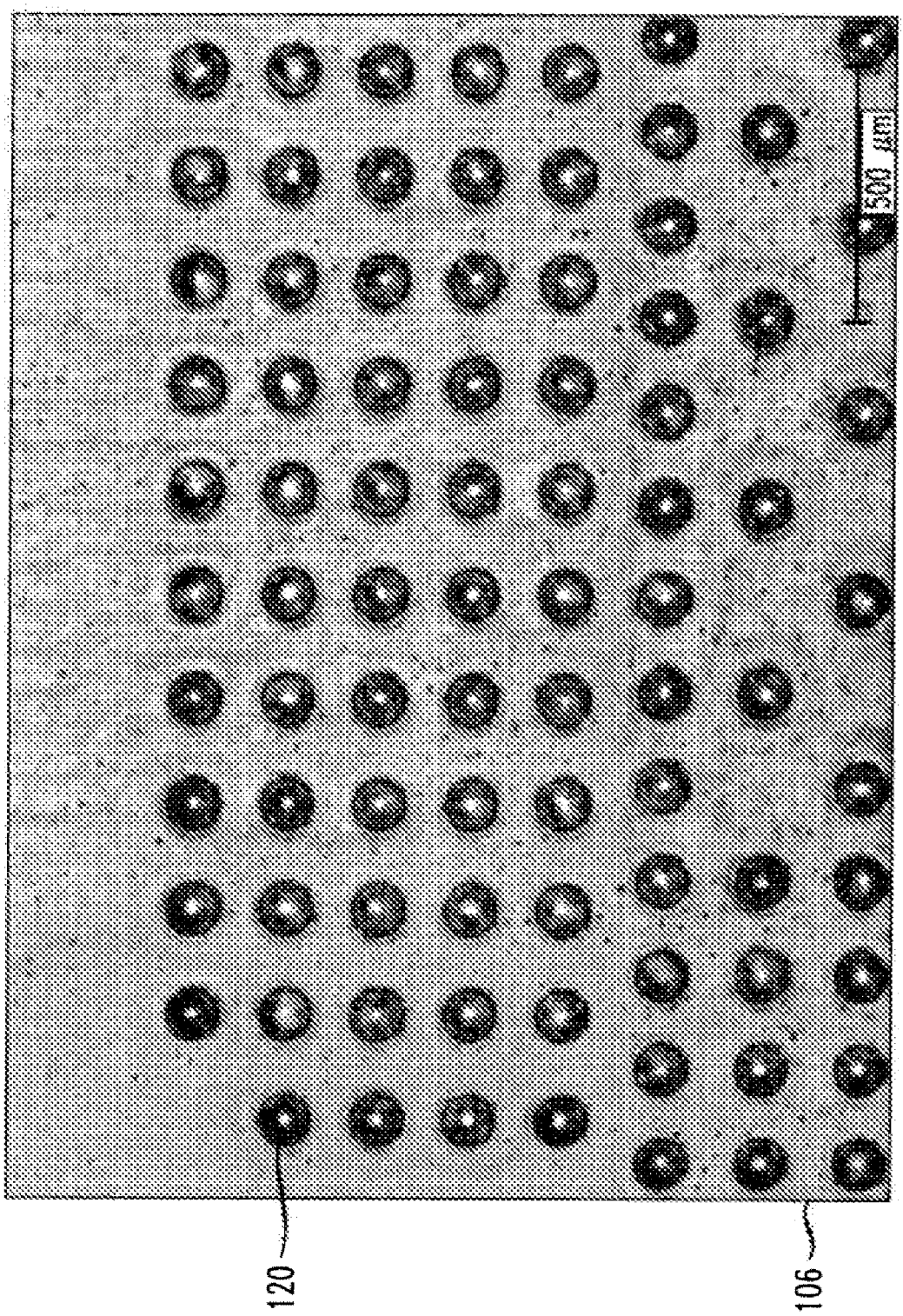
Figure 34:
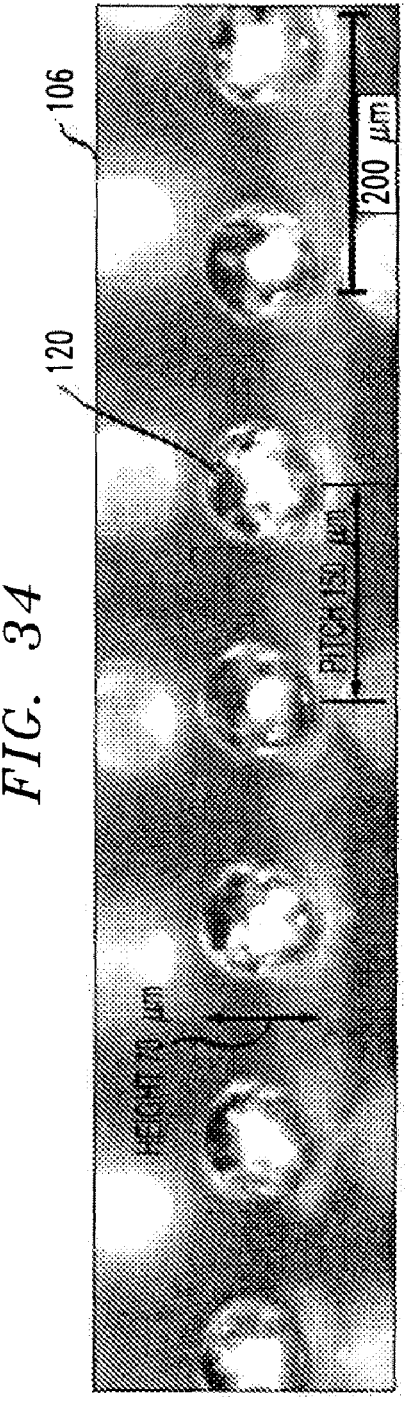
Figure 35:
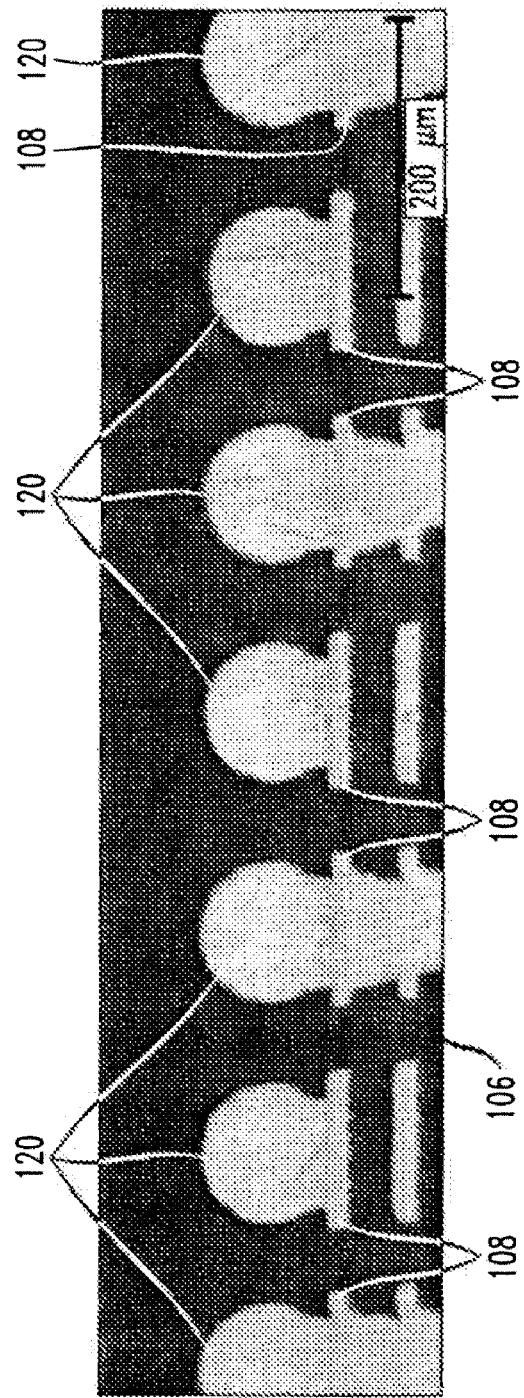

FIGS. 28 and 29 show solder structures 110 at fifty times and 100 times magnification, from the side. FIG. 30 shows a cross section of the solder structures 110. FIGS. 31 and 32 show solder structures 110 at fifty times and 100 times magnification, from the top. FIGS. 33 and 34 show substantially hemispherical solder bumps 120 at fifty times and 100 times magnification, from the top. FIG. 35 shows a cross section of the hemispherical solder bumps 120.

In view of the discussion thus far, it will be appreciated that, in general terms, an exemplary method, according to an aspect of the invention, includes obtaining a flexible unitary mask, such as 102, having a plurality of through holes, such as 104. The method also includes obtaining a substrate, such as 106 or 2206, having a plurality of wettable pads, such as 108, in recessed regions defining volumes. The method further includes aligning the through holes with the wettable pads; for example, as shown in FIG. 4, as shown at region 148 in FIG. 10, as shown in FIG. 12, as shown in FIG. 19, or as shown in FIG. 25.

As used herein, a "unitary" mask includes one formed from a single layer, as well as one formed from multiple layers, provided that such layers remain attached to each other during the solder bumping process.

Additional steps include directly injecting molten solder through the through holes of the flexible unitary mask into the volumes with the wettable pads, for example, as shown in FIG. 5, such that the through holes and the volumes with the wettable pads are filled with solder; and allowing the solder to solidify, whereby the solder forms a plurality of solder structures, such as 110, adhered to the wettable pads. A further step includes peeling the flexible unitary mask from the substrate (for example, onto a take-up reel such as 118 with use of a roller such as 3004) after the solder has solidified, as seen, for example, in FIGS. 6 and 9.

Preferably, an additional step includes re-heating the substrate and the solder after the peeling, to re-flow the solder, as shown at FIG. 8. Such step is preferably followed by cooling the substrate to re-solidify the re-flowed solder.

Preferably, at least the step of directly injecting the molten solder is carried out in an oxide reducing atmosphere; for example, the substrate, mask, and IMS head (such as 112) can be located in an oxide reducing atmosphere. One way to achieve this is by locally flushing the area with dry nitrogen from a nozzle, such that the local concentration of oxygen is less than about 5,000 parts per million, and preferably as low as possible (from a practical point of view, a level of about 50 parts per million may be a realistic achievable lower bound). In a presently preferred embodiment, the step of directly injecting the molten solder is carried out with the IMS fill head, and preferably, the substrate, the mask, and the injection molded solder fill head heated above the melting temperature of the solder. Note that as used herein, including the claims, when reference is made to such heating, it is to be understood that every part of the substrate, mask, and fill head are not necessarily at a temperature above the melting temperature of the solder, but at least those portions that need to be heated to facilitate proper solder filling are heated.

Preferably, the step of allowing the solder to solidify includes deliberately cooling the substrate to solidify the solder; for example, in a cooling zone such as 144. In the step of obtaining the mask, the through holes are preferably frustoconical, having larger ends and smaller ends; and preferably, the larger ends of the holes, such as holes 104, are positioned adjacent the pads, such as pads 108, as best seen in FIG. 4.

As seen in FIGS. 13-15, in one or more embodiments, in the step of obtaining the substrate, the substrate includes a base substrate, such as 1380, with a plurality of solder resist regions, such as 1382, defining the recessed regions. As noted, the step of directly injecting the molten solder can be carried out with an injection molded solder fill head, such as 112. In one or more embodiments, the fill head includes compliant material, such as 116, interposed between the fill head and the flexible unitary mask to force the flexible unitary mask to conform to topographical features of the substrate, as seen in FIG. 15.

As shown, for example, in FIGS. 16-21, in some instances, the mask 102 includes a plurality of patterned through-hole regions 152; the step of obtaining the substrate includes obtaining a plurality of substrates 106 sufficient to match the plurality of regions 152 in the mask; and the aligning step is repeated for all of the substrates, as best seen in FIG. 19.

As shown, for example, in FIGS. 22-27, in some instances, the mask 102 includes a plurality of patterned through-hole regions 152; and the step of obtaining the substrate includes obtaining a panel-size substrate 2206 having a plurality of patterned wettable-pad regions 150 sufficient to match the plurality of patterned through-hole regions 152 in the mask.

In view of the discussion thus far, it will be further appreciated that, in general terms, an aspect of the invention includes an exemplary apparatus for forming solder structures such as 110 on a substrate, such as 106 or 2206, having a plurality of wettable pads, such as 108, in recessed regions defining volumes. The apparatus includes a flexible unitary mask, such as 102, having a plurality of through holes, such as 104; as well as a substrate carrier, such as 130, configured to receive the substrate. Also included is an alignment stage, such as at 148 configured to align the through holes with the wettable pads. Such stage may make use of, for example, base plates such as 146 or 2246. Further included is an injection molded solder head, such as 112, configured to directly inject molten solder through the through holes of the flexible unitary mask into the volumes with the wettable pads, such that the through holes and the volumes with the wettable pads are filled with solder, as best seen in FIG. 5. Other elements of the apparatus include a cooling stage, such as 144, which allows the solder to solidify, whereby the solder forms the plurality of solder structures, such as 110, adhered to the wettable pads; and a take-up member configured to peel the flexible unitary mask from the substrate (for example, roller 3004 which facilitates peeling and subsequent take-up on reel 118). Ideally, the decal 102 separates from the filled substrates 106 on a row-by-row basis, or at most a few rows at a time, to reduce separation forces. Even though there is no wetting between the solder and the decal, there is an attractive force due to the vacuum between the parts. In a non-limiting example, peel roller 3004 may have a diameter that is about the same as, or somewhat less than, the width into the paper of the array of solder structures 110 (the width and the length of the array typically being approximately equal), such that only a few millimeters of decal 102 are separated at a time.

The apparatus preferably includes a drive mechanism for the substrate carrier, as indicated at 134, 136 in FIG. 9. As noted, the mask may be configured with a plurality of sprocket holes, such as 164, and the substrate carrier can be further configured with a plurality of drive pins, such as 162, to engage the sprocket holes and impart motion to the mask upon actuation by the drive mechanism.

As shown, for example, in FIGS. 16-21, in some instances, the mask includes a plurality of patterned through-hole regions, such as 152; the substrate carrier is configured to support a plurality of substrates 106 sufficient to match the plurality of regions in the mask; and the aligning stage is configured to individually align all of the plurality of substrates with corresponding ones of the plurality of patterned through-hole regions, as best seen in FIG. 19.

As shown, for example, in FIGS. 22-27, in some instances, the mask includes a plurality of patterned through-hole regions, such as 152; the substrate carrier is configured to support a panel-size substrate 2206 having a plurality of patterned wettable-pad regions 150 sufficient to match the plurality of patterned through-hole regions 152 in the mask; and the aligning stage is configured to simultaneously align all of the plurality of patterned wettable-pad regions with corresponding ones of the plurality of patterned through-hole regions, as best seen in FIG. 25.

The methods described above can be used in the fabrication and packaging of integrated circuit chips; in particular, techniques set forth herein can be used to make arrays of solder balls for attachment to an integrated circuit chip. The chip design can be created, for example, in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design can then be converted into an appropriate format such as, for example, Graphic Design System II (GD-SII), for the fabrication of photolithographic masks, which typically include multiple copies of the chip design in question that are to be formed on a wafer. The photolithographic masks can be utilized to define areas of the wafer (and/or the layers thereon) to be etched or otherwise processed.

Resulting integrated circuit chips can be distributed by the fabricator in raw wafer form (that is, as a single wafer that has multiple unpackaged chips), as a bare die or in a packaged form. In the latter case, the chip can be mounted in a single chip package (such as a plastic carrier, with leads that are affixed to a mother board or other higher level carrier) or in a multi-chip package (such as a ceramic carrier that has either or both surface interconnections or buried interconnections). In any case, the chip may then be integrated with other chips, discrete circuit elements and/or other signal processing devices as part of either (a) an intermediate product, such as a mother board, or (b) an end product. The end product can be any product that includes integrated circuit chips, ranging from toys and other low-end or consumer electronic applications to advanced computer products, having a display, a keyboard or other input device, and a central processor. The techniques set for the herein can be used for interconnecting the chip on chips or chip stacks for 3D applications, chips on wafers, chips on package or package on package.

It will be appreciated and should be understood that the exemplary embodiments of the invention described above can be implemented in a number of different fashions. Given the teachings of the invention provided herein, one of ordinary skill in the related art will be able to contemplate other implementations of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus for forming solder structures, said apparatus comprising:
    a substrate that is a supporting material on which a circuit is formed and has a plurality of wettable pads in recessed regions defining volumes;
    a flexible unitary mask having a plurality of through holes;
    a substrate carrier configured to receive the substrate;
    a movable base plate positioned on the substrate carrier between the substrate carrier and the substrate;
    an alignment stage configured to align said through holes with the wettable pads;
    an injection molded solder head configured to directly inject molten solder through said through holes of said flexible unitary mask into the volumes with the wettable pads, such that said through holes and the volumes with the wettable pads are filled with solder;
    a cooling stage which allows the solder to solidify, whereby the solder forms the plurality of solder structures, adhered to the wettable pads; and
    a take-up member configured to peel said flexible unitary mask from the substrate.

2. The apparatus of claim 1, wherein said take-up member comprises a peel roller.

3. The apparatus of claim 2, further comprising a drive mechanism for said substrate carrier, wherein:
    said mask is further configured with a plurality of sprocket holes; and
    said substrate carrier comprises is further configured with a plurality of drive pins to engage said sprocket holes and impart motion to said mask upon actuation by said drive mechanism.

4. The apparatus of claim 1, wherein:
    said mask comprises a plurality of patterned through-hole regions;
    said substrate carrier is configured to support a plurality of substrates sufficient to match said plurality of regions in said mask; and
    said aligning stage is configured to individually align all of the plurality of substrates with corresponding ones of said plurality of patterned through-hole regions.

5. The apparatus of claim 1, wherein:
    said mask comprises a plurality of patterned through-hole regions;
    said substrate carrier is configured to support a panel-size substrate having a plurality of patterned wettable-pad regions sufficient to match said plurality of patterned through-hole regions in said mask; and
    said aligning stage is configured to simultaneously align all of the plurality of patterned wettable-pad regions with corresponding ones of said plurality of patterned through-hole regions.

* * * * *